TIME POSITION SELECTION SYSTEM
Filed Dec. 27, 1965 3 Sheets-Sheet 1
Fig. 4
| 3RD DECIMAL DIGIT (Z) / 2ND DECIMAL DIGIT (Y) | 1 | 3 | 5 | 7 | |
|---|---|---|---|---|---|
| 1 | 1 | 2 | 3 | 4 | 00000 |
| 2 | 5 | 6 | 7 | 8 | 00100 |
| 3 | 9 | 10 | 11 | 12 | 01000 |
| 4 | 13 | 14 | 15 | 16 | 01100 |
| 5 | 17 | 18 | 19 | 20 | 10000 |
| 6 | 21 | 22 | 23 | 24 | 10100 |
| | 00000 | 10000 | 01000 | 11000 | |
Fig. 2
| DECIMAL DIGIT DIALED | BINARY WEIGHTED DIGITS 4 | 2 | 1 |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |
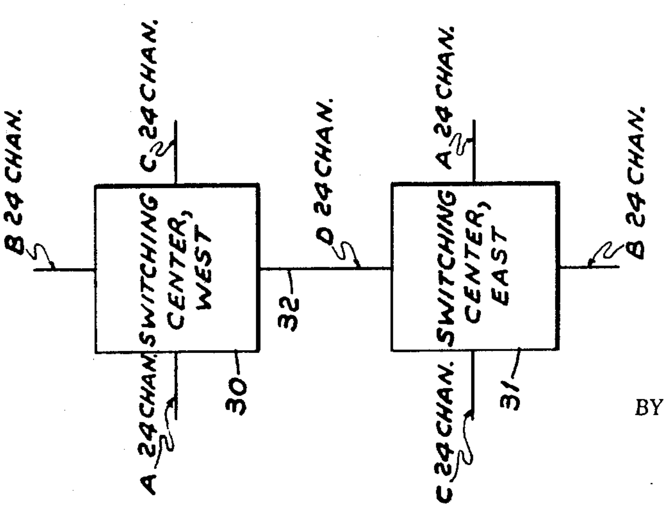
Fig. 1
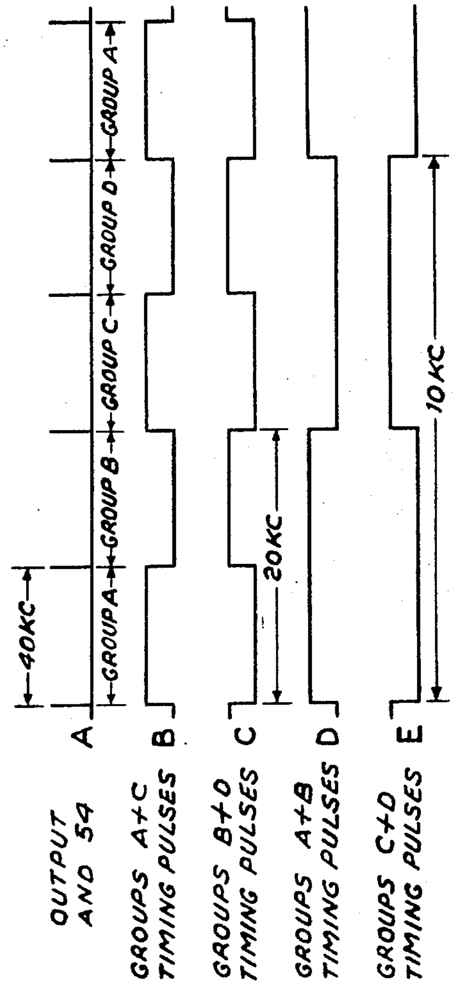
Fig. 6
Fig. 3
| GROUP | EAST SWITCHING CENTER | WEST SWITCHING CENTER |
|---|---|---|
| A | 7 | 6 |
| B | 5 | 4 |
| C | 3 | 2 |
INVENTOR.
WARREN G. BROWN
BY Alfred C. Hill
AGENT

TIME POSITION SELECTION SYSTEM

Filed Dec. 27, 1965 3 Sheets-Sheet 2

INVENTOR.
WARREN G. BROWN
BY Alfred C. Hill
AGENT

TIME POSITION SELECTION SYSTEM

Filed Dec. 27, 1965 3 Sheets-Sheet 3

INVENTOR
WARREN G. BROWN
BY Alfred C. Hill
AGENT

United States Patent Office 3,456,082

Patented July 15, 1969

3,456,082
TIME POSITION SELECTION SYSTEM

Warren G. Brown, River Vale, N.J., assignor to International Telephone and Telegraph Corporation, Nutley, N.J., a corporation of Maryland Filed Dec. 27, 1965, Ser. No. 516,475
Int. Cl. H04j 3/00
U.S. Cl. 179—15 10 Claims

ABSTRACT OF THE DISCLOSURE

A channel time position selection system is disclosed. The selection systems responds to a source of uniquely coded dialed information including three sequential binary numbers each having three binary weighted binary digits. A first means responds to the least significant weighted binary digital of the first dialed binary number to generate a signal indicative of whether the called party is coupled to one switching center or another switching center. A second means responds to the two most significant weighted binary digits of the first dialed binary number to generate a second signal indicative of the transmission medium coupled to the selected switching center to which the called party is connected. Still another means responds to all the digits of the second dialed binary number and the two most significant digits of the third dialed binary number to generate a third signal indicative of the information channel of the selected transmission medium to which the called party is assigned.

This invention relates to time position selection systems and more particularly to a system to generate output signals to select a channel time position, designated by a received signal, present in a plurality of channel time positions which may be in the form of a plurality of groups of channel time positions.

An object of this invention is to provide a channel time position selection system resulting in a saving in a number of components employed and, hence, a reduction in the space required and cost for such a system as compared to related types of previously employed channel time position selection systems.

In general, one type of channel time position selection system comprises a pulse distributor to establish a plurality of channel time positions, a register or storage device to store a received signal, readout gates for the register, and a channel time position selector matrix coupled to the pulse distributor and the readout gates in a manner to enable the selection of a channel time position designated by the received signal from said plurality of time positions.

To indicate the order of magnitude of component, cost and space saving, let it be assumed that one out of twenty-four channel time positions is to be selected by a received signal. One embodiment of the above-mentioned type of prior art selection systems required that the pulse distributor have twenty-five outputs, twenty-four channel time position outputs and a frame synchronizing output, that the register include ten flip flops to store the received signal, that 48 diodes be used in the register readout gates, and that the channel time position selection matrix include 96 diodes. In accordance with the principles of this invention, a channel time position selection system is provided comprising a pulse distributor having only eleven outputs, one of which is the frame synchronizing output, resulting in a saving of fourteen components for transmission paths, a register including nine flip flops, a saving of one flip flop, and combined register readout gates and channel time position selector matrix requiring only 49 diodes, a saving of 95 diodes.

Other objects of this invention include a unique code signal to designate the channel time position to be selected aiding in obtaining the above-mentioned reduction in components, space and cost; a pulse distributor providing $y$ timing pulses and $x$ timing pulses so combined that $x$ times $y$ channel time positions result one of which is selected by the unique code signal; and a communication system having at least two switching centers interconnected by a trunk or first transmission medium with each of the switching centers being coupled to a plurality of additional transmission mediums each including a plurality of time sequential information channels. Each of the switching centers includes the selection system of this invention which is responsive to a dialed signal in the form of said unique code to indicate the switching center, the particular transmission medium and the information channel of said particular transmission medium to which the called party is connected.

A feature of this invention is the provision of a source of a plurality of signals representing the designated channel time position to be selected from a plurality of groups of channel time positions, a first means responsive to one of the plurality of signals to generate a first signal indicative of a given group of the plurality of groups; and second means coupled to the source responsive to others of the plurality of signals to generate a second signal indicative of a channel time position disposed in said given group, said first and second generated signals enabling the selection of said designated channel time position.

Another feature of this invention is the provision of a generator to define sequential time positions comprising a source of $y$ timing pulses, a source of $x$ timing pulses, and an arrangement coupled in common to both the timing pulse sources for unique combining thereof to define $y$ times $x$ sequential time positions.

A further feature of this invention is the provision of a system, disposed in at least each of two switching centers interconnected by a first transmission medium and a plurality of additional transmission mediums each conveying intelligence by a plurality of sequentially disposed information channels, to generate output signals from dialed information indicating the switching center, the particular transmission medium and the information channel present in said particular transmission medium of the called party comprising a source of dialed information including three sequential binary numbers each having three binary weighted binary digits, first means responsive to the least significant weight binary digit of the first of the three binary numbers to generate a first signal indicative of the switching center to which the called party is coupled, second means responsive to the two most significant weight binary digits of the first of the three binary numbers to generate a second signal indicative of the additional transmission medium to which said called party is coupled, and third means responsive to all the digits of the second of the three binary numbers and the two most significant digits of the third of the three binary numbers to generate a third signal indicative of the information channels of the indicated additional transmission medium to which said called party is assigned.

Still a further feature of this invention is the provision of a system for generating an output signal to select a designated channel time position present in a plurality of channel time positions comprising a first source of at least two sequential binary numbers each having three binary digits, a second source of $x$ timing pulses, a third source of $y$ timing pulses, and logic circuitry coupled to the first, second and third sources responsive to all said digits of one of said binary numbers and two predetermined digits of the other of said binary numbers to generate a signal indicative of the channel time position designated by the binary numbers present in $x$ times $y$ channel positions.

The above-mentioned and other features and objects of this invention will become more apparent by reference to the following description taken in conjunction with the accompanying figures, in which:

FIG. 1 is a block diagram of one type of communication system in which the time position selection system of this invention could be employed;

FIGS. 2, 3 and 4 are tables useful in demonstrating the unique code signal employed in connection with the selection system of this invention;

FIGS. 6 and 7 are timing diagrams useful in explaining the operation of the system of FIG. 5.

Figure 5:
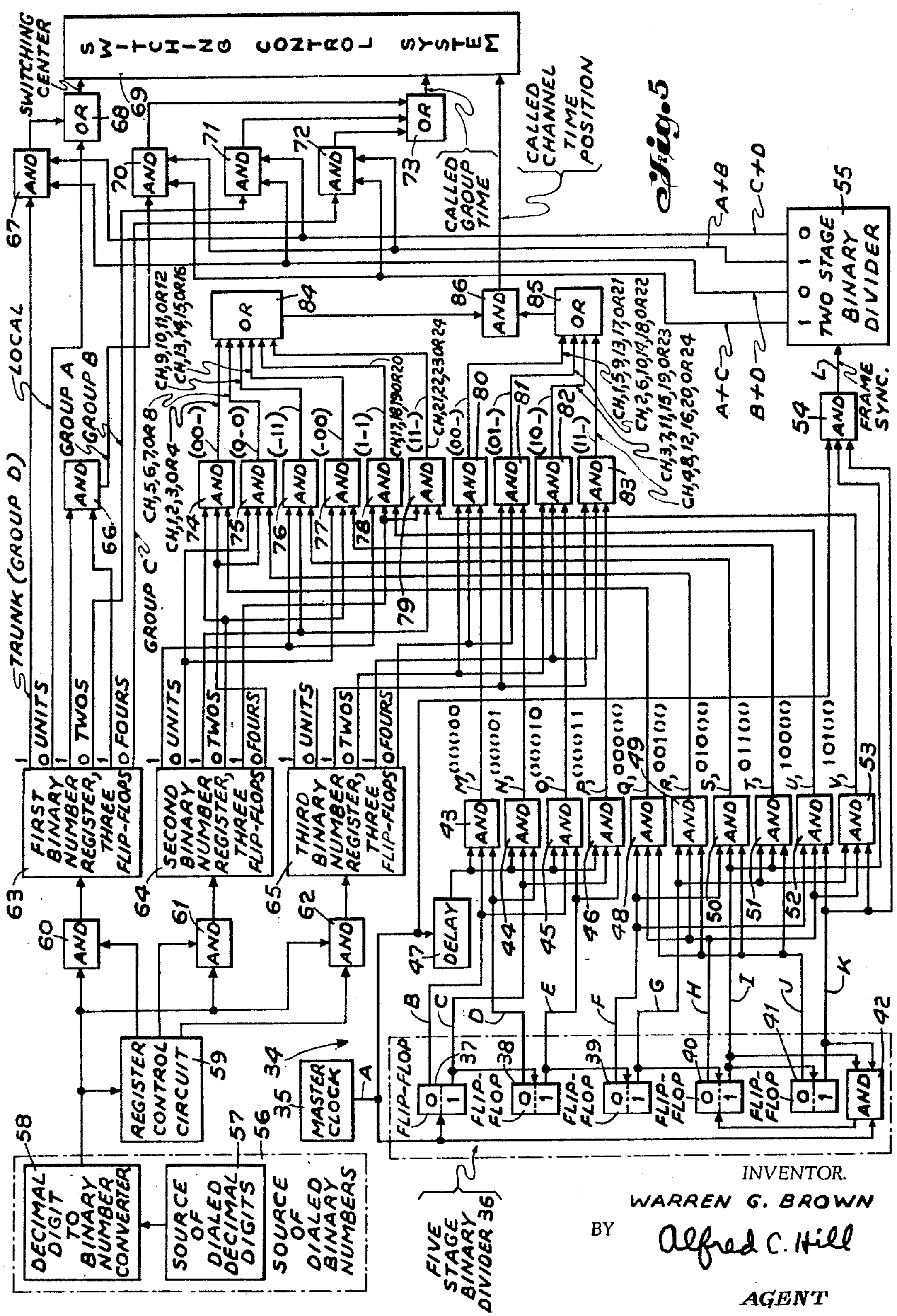
FIG. 5 is a block diagram of a time position selection system in accordance with the principles of this invention.

FIG. 1 illustrates a communication system incorporating two switching centers 30 and 31 interconnected by a trunk transmission medium 32. Each of the switching centers 30 and 31 have coupled thereto additional transmission mediums A, B and C each capable of handling twenty-four information channels. Through the use of the time position selection system of this invention, included in each of centers 30 and 31, it is possible for one subscriber to dial a called party's telephone number, having the dialed information detected, and to generate signals indicative of the switch center, the transmission medium or group of time positions and the time position of the called party to activate the switching mechanism of the switching center to which the transmission medium of the called party is connected and, thereby, with time position information of the calling party establish a connection between the called party and the calling party.

Each of the switching centers 30 and 31 has transmission mediums A, B and C coupled thereto, which are designated herein as time position groups since each of these transmission mediums or groups contain twenty-four channel time positions. Thus, each switching center 30 and 31 will have three local transmission mediums and three remote transmission mediums connected to it through the means of the trunk transmission medium 32. This results in a total of 144 different subscriber designations or telephone numbers. To enable the production or generation of the timing position signal of the called party designated by the dialing signal, it is necessary to provide some type of signal representing the designated channl time positions. To accomplish this, the present invention employs a unique code signal for the dialing signal to activate the time position selection system of this invention to produce the signals representing the channel time position designated by the dialed signal.

The 144 telephone numbers can be individually represented by three decimal digits which may be dialed by the calling subscriber. These dialed decimal digits are each converted into a three digit weighted binary number for transmission from the dialing mechanism or subscriber subset to the switching center to which it is attached to activate the selection system of this invention to generate signals which will provide the proper switching operation in the switching center to establish a connection between the calling party and the called party as designated by the dialed digits in binary form. In accordance with the unique code employed in this invention the decimal digit 0 is not employed thus the dialed number may be considered a three digit octal based number to designate each possible telephone circuit. Thus, employing the numbers 1 to 7 there can be established 343 combinations of possible telephone numbers but the 144 combinations required in the system of FIG. 1 was chosen in such a way that very simple circuits could be used in the time position selection system of this invention, for instance, the use of a minimum number of diodes in the selection matrix as well as a minimum number of diodes in the components feeding the time position selection matrix.

FIG. 2 illustrates a table in which the decimal digit dialed is related to binary weighted numbers with the unit column indicating the least significant digit, the two's column representing the next most significant digit and the four's column representing the most significant digit of the binary number resulting from the dialed decimal digit.

For purposes of explanation, let us assume that the three digit number dialed, in decimal form, is XYZ. X is the first digit of the dialed number and provides two bits of information. First, digit X is converted to its binary number equivalent and the least significant weight binary digit determines the switching center to which the called party is connected. It has been decided that all the phone numbers that start with odd decimal digits are assigned to center 31 and all those phone numbers starting with even decimal digits are assigned to center 30. Whether a decimal digit is odd or even can be ascertained from its binary equivalent by detecting the characteristic of the least weight digit of the resultant binary number. Second, the digit X also indicates the group of time positions, or in other words, the transmission medium connected to the selected switching center to which the called party is connected. This is done by detecting the condition of the two most significant binary digits of the binary number equivalent of digit X. FIG. 3 is a table relating the decimal digit to its particular switching center as well as the time position group coupled to the designated switching center. As indicated, X equals only 2 through 7. Even digits 2, 4 and 6 designating switching center 30 and also time position groups, or transmission mediums CBA, respectively. Odd digits 3, 5 and 7 designate switching center 31 and also time position groups, or transmission mediums CBA, respectively.

The digit Y and Z designate the channel time position of the called party. The digit Y will be any of the digits 1 through 6 while the digit Z can be either 1, 3, 5 or 7. Thus, digit Y indicates six groups of four consecutive time positions while the digit Z tells which of the four channels selected by digit Y is actually requested. This is illustrated in the table of FIG. 4 wherein digit Y represents four consecutive time positions and digit Z represents six spaced time positions arranged in such a manner that the simultaneous presence of one Y digit and one Z digit will select the given time position of the called party.

FIG. 5 illustrates one embodiment of the time position selection system of this invention. The timing pulse distributor 34 includes a master clock 35 coupled to a five stage binary divider 36 including therein five flip flops 37, 38, 39, 40 and 41. For purposes of explanation, it will be assumed that there are twenty-four channel time positions and a frame synchronizing signal position, namely, twenty-five timing positions. The twenty-five channel time positions will be represented by ten outputs. These ten outputs are derived as follows. The output of master clock 35, for purposes of explanation may be one megacycle pulse signal, is illustrated in Curve A, FIG. 7 and is coupled symmetrically to flip flop 37 whose "1" output is coupled symmetrically to flip flop 38 which in turn couples its "1" output symmetrically to flip flop 39. The "1" output of flip flop 39 is coupled symmetrically to flip flop 40. The last flip flop 41 has the "1" output of flip flop 40 coupled symmetrically thereto. Using five stages without modification in the divider 36 would result in 32 to 1 divider, however, since it is only necessary to define twenty-four time positions or divide by twenty-four, the "1" output of flip flop 40 and the "1" output of flip flop 41 are coupled to AND 42 producing an output signal which will be coupled back to flip flop 40 to change the timing sequence thereof. The third input to AND 42 from master clock 35 is to assure a proper width feedback pulse activating flip flop 40 to change the counting of the binary divider 36. The resultant outputs of flip flops 37 through 41 are illustrated in Curves B, C, D, E, F, G, H, I, J, and K, FIG. 7.

The first four, or *x*, timing pulses are produced by AND's 43, 44, 45, and 46 all interconnected to the "1" and "0" outputs of flip flops 37 and 38. The input from clock 35 through a delay 47 is employed to provide a very short and well defined pulse for the output of AND's 43, 44, 45, and 46. The resultant outputs from these AND's are illustrated, respectively, by Curves M, N, O and P, of FIG. 7. The nomenclature employed on the output leads of AND's 43, 44, 45 and 46 is arranged from the most significant to the least significant digit reading from left to right and, since, only the first two least significant stages of divider 36, namely, flip flops 37 and 38, generate the output signals from these four AND's 43 through 46 the three most significant stages do not enter into producing the outputs. The combination 01 indicates by the "0" and "1" indication and their relative position which stage of the flip flops and their position indicates the two flip flops 37 and 38 produce the resultant outputs illustrated in Curves M, N, O and P, FIG. 7.

Figure 7:
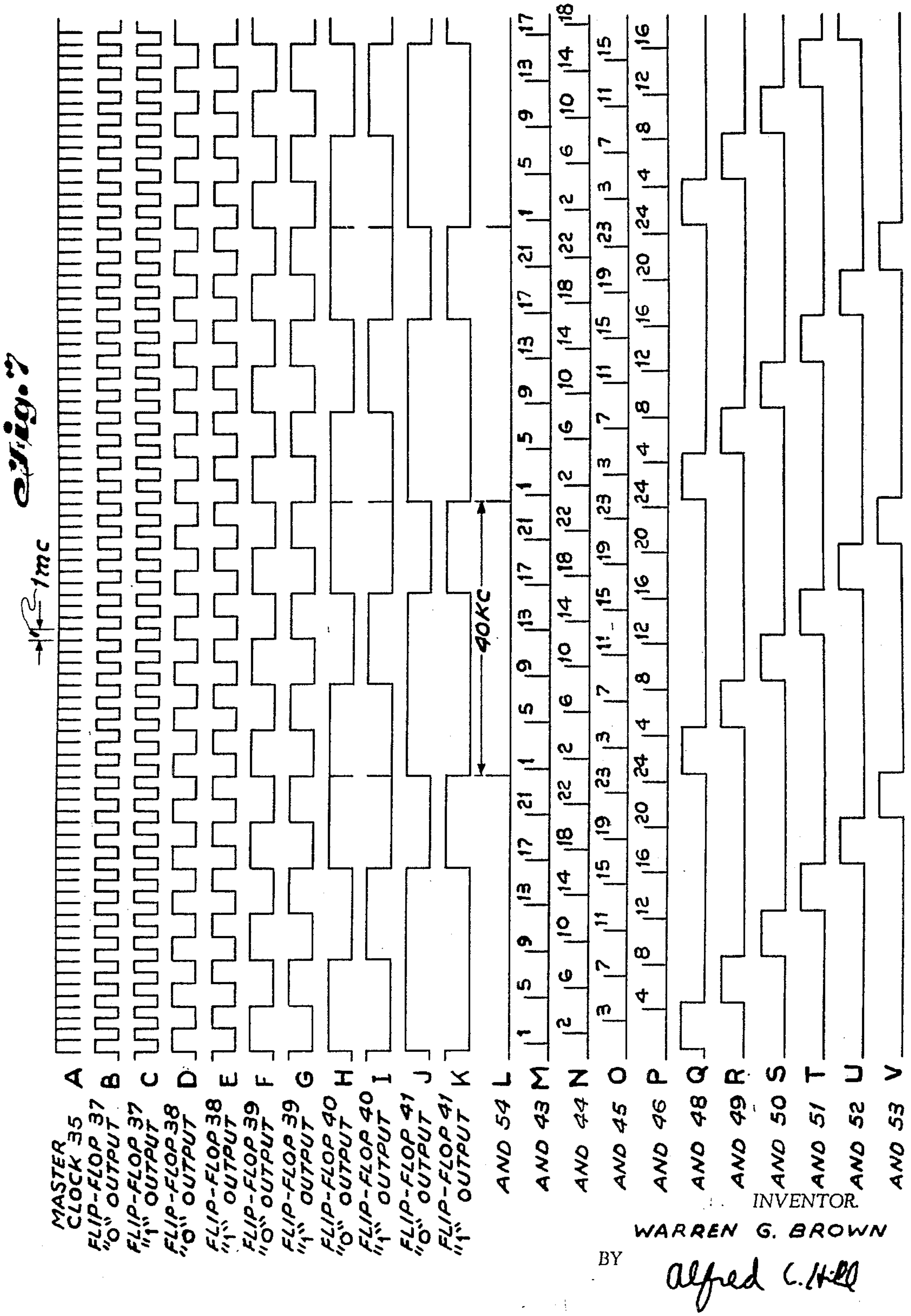

The AND's 48, 49, 50, 51, 52 and 53 are coupled to the most significant stages 39, 40 and 41 of the binary divider 36 in a predetermined manner to produce six of a possible eight outputs as illustrated in Curves Q, R, S, T, U and V, FIG. 7. The nomenclature used at the outputs of AND's 48 through 53 is the same as employed at the outputs of AND's 43 through 36 and indicates the stage of which flip flop is employed to produce and the resultant output signal. For instance, to obtain the output of AND 48, the outputs from the "0" stages of the flip flops 39, 40 and 41 are employed.

The output from master clock 35 and the output from the "1" stages of each of the flip flops 40 and 41 are coupled to an AND gate 54 to produce the frame synchronizing signal as illustrated in Curve L, FIG. 7. The output of AND gate 54 is coupled to the two stage binary divider 55 to produce the group or tag selection voltages required in the designation of the switching center to which the called party is connected and also the group time containing the time position of the designated switching center. Curve A, FIG. 6 represents the frame synchronizing signal generated by AND gate 54 which triggers the first stage of divider 55 to produce the output as illustrated in Curves B and C, FIG. 6. The output of the first stage of divider 55 then triggers the second stage of divider 55 to produce at the output thereof the Curves D and E, FIG. 6. It will be noted that in accordance with the example employed herein the frame synchronizing pulse is at a rate of 40 kc., the group timing pulses $A+C$ and $B+D$ are at a rate of 20 kc. and the groups $A+B$ and $C+D$ are at a rate of 10 kc.

Having now established the time pulse outputs of distributor 34, we will now proceed with the description of the remainder of FIG. 5 wherein the dialed signal actually makes the selection of the group called the switching center to which the group is connected and the channel time position within the selected group.

The dialed binary numbers are coupled from source 56 which includes therein a source of dialed decimal numbers 57 and a decimal digit to binary number converter 58. The resultant dialed signal in binary form is detected by the register control circuit 59 which through the means of AND's 60, 61 and 62 load the registers 63, 64 and 65. Each of the registers 63, 64 and 65 include three flip flop circuits with the first binary number being registered in register 63, the second binary number being registered in register 64 and the third binary number being registered in register 65.

The "units" flip flop can produce two outputs either a "1" or "0" depending upon the binary digit stored therein which is detected and utilized to indicate whether the called party is associated with the local switching center or the remote switching center through the trunk which actually is group D as generated by the binary divider 55. The "two" and "four" stage outputs of register 63 cooperate to indicate which of the groups A, B or C the called number is located in. This is accomplished by means of the AND circuit 66 which is connected to the "1" output of the "two" and "four" stages of the register 63 to indicate group A while the "0" output of the "two" stage indicates group C and the "0" output of the "four" stage indicates group C. The "1" output of the unit" stage of register 63 is connected to AND 67 which has two inputs from binary divider 55, one of these inputs being the $A+C$ group signals and the other the $C+D$ group signals. Coincidence of an output from the "1" output of the "unit" stage and the two designated outputs of divider 55 in AND gate 67 generates a signal indicating the remote or group D switching center. This is coupled through OR 68. On the other hand when the output on the "0" output of the "unit" stage is in the "up" position it is coupled directly to OR 68 producing a signal indicating that the called party is connected to the local switching center. The output of OR 68 is coupled to the switching control system 69 which under the control of the various outputs produced by the time position selection system enables the establishment of a connection between the calling party and the called party. The details of this switching control system are not present herein since it does not form a part of the invention disclosed but is only incorporated in block form to indicate where the various outputs of the selection system are coupled and give a general indication of the operation which they form.

The output of AND 66 is coupled to AND 70 which has coupled thereto from divider 55 the $A+C$ and the $A+B$ signal. The "0" output of the "two" stage of register 63 is coupled to AND 71 which has coupled thereto the $B+D$ and $A+B$ signal of binary divider 55. The "0" output of the "four" stage of register 63 is coupled to AND 72 which in turn has coupled thereto the $A+C$ and the $C+D$ signals of divider 55. A coincidence between the signals coupled to AND's 70, 71 and 72 produces an output therefrom which is coupled to OR 73 to generate an output signal therefrom for coupling to system 69 indicating the called group time, or in other words, the transmission medium, to which the called party is connected.

The timing signals from AND's 48, 49, 50, 51, 52 and 53 are coupled to AND's 74, 75, 76, 77, 78 and 79, respectively. In turn each of AND's 74 through 79 are coupled to the various outputs of the three stages of the second binary number register 64. The output signals of the stages of the register 64 to which AND's 74 through 79 are coupled are six of a possible eight combinations for these output signals and are designated on the output line of each AND in the form of "0's" and "1's" with a dash in a certain position. The most significant number is to the left. For instance, AND 74 is coupled to the "0" output of the "four" flip flop register 64 and the "0" output of the "two" stage of register 64. AND gate 75 is coupled to the "0" output of the "four" stage of register 64 and the "0" output of the "one" stage of register 64. It will be observed that since neither zero nor seven is assigned to the second decimal digit that in binary form each decimal digit contains either two "0" or two "1" and that each combination can be recognized without sensing the third binary bit. This permits a reduction in the number of diodes needed per flip flop of the register. It will be also noted that the channel time position numbers represented by the outputs from AND's 48 through 53 are indicated at the outputs of AND's 74 through 79.

The third number is registered in register 65 and it will be noted that only the two most significant flip flops of register 65 have their "0's" and "1's" outputs coupled to AND's 80, 81, 82 and 83. This results in a reduction in the number of AND's in the channel time position selector matrix since the "unit" stage of register 65 is not being used which is possible due to the unique code employed in connection with the timing position selection system of this invention. The other inputs to AND's 80, 81, 82 and 83 are from AND's 43, 44, 45, and 46, respectively. Again the notation at the output of AND's 80 through 83 means the same as pointed out hereinabove in respect to AND's 74 through 79. The "0" and "1" outputs of the two most significant stages of register 65 are utilized to select the particular channel time position present in the output of AND's 43 through 46. For instance, AND 80 has one of its inputs coupled to the "0" output of the most significant digit and the other of its inputs to the "0" output of the next significant digit stage of register 65. AND 81 has coupled thereto the "0" output of the most significant stage of register 65 and the "1" output of the next significant stage of register 65. There is also indicated at the output of AND's 80 through 83 the channel positions capable of being passed therethrough depending upon the selection made.

The output from AND's 74 through 79 are coupled to OR 84 while the output of AND's 80 through 83 are coupled to OR 85. The output of OR's 84 and 85 are coupled to AND 86 which makes the selection of the channel time position for coupling to the switching control system 69.

For purposes of explanation, let us assume that the decimal number 645 is dialed and at the output of source 57. This decimal number will be converted to a binary number 110 corresponding to decimal digits 6, 100 corresponding to decimal digit 4, and 101 corresponding to decimal digit 5 with the most significant binary digit being to the left of the above binary numbers. The resultant binary numbers are coupled from source 56 and loaded in registers 63, 64 and 65 through cooperation of circuit 59 and AND's 60, 61 and 62. Considering first register 63 a "1" will be in the "four" stage, a "1" in the "two" stage and a "0" in the "unit" stage. A "0" output from the "unit" stage is coupled to OR 68 and produces an output to system 69 to indicate that the local switching center is coupled to the called number. The "1" output on both the "two" and "four" stages will be coupled to AND 66 and, hence, to AND 70 which will then be passed to OR 73 indicating the called group time to be group A. It should be noted that the output from AND 70 is gated therethrough by the A+C and A+B outputs of divider 55.

Considering now the second binary number register 64 there will be stored therein a "1" in the "four" stage, a "0" in the "two" stage and a "0" in the "unit" stage. The "0" outputs of the "units" and "two" stages of register 64 are high and thereby selects the sequential timing positions 13, 14, 15 and 16 through the means of AND 77. This output is indicated in Curve T, FIG. 7 and is coupled to OR 84 and, hence, to AND 86.

The third binary number register 65 has stored therein a "1" in the "four" stage, a "0" in the "two" stage and a "1" in the "unit" stage. The "1" in the unit stage plays no function in the time position selection system of this invention since it is not further connected to any of the other circuits of this system. Register 65 will produce a high output on the "0" output of the "two" stage and on the "1" output of the "four" stage and will select AND 82 through which the pulses as indicated in Curve O, FIG. 7 are passed to OR 85 and, hence, to AND 86. The table of FIG. 4 indicates in the column under 5 (third decimal digit of the example) that the time positions on the output of AND 82 are 3, 7, 11, 15, 19 or 23. The selected output from AND 77 is 13, 14, 15, and 16 as indicated in the row opposite 4 (the second decimal digit of the example). The table of FIG. 4 indicates a time coincidence at time position 15 between row 4 and column 5 and this time position is the selected time position of the called party. Also referring to FIG. 7, it will be observed that Curve T was passed by AND 77 and Curve O was passed by AND 45. Thus, it will be observed that channel position 15 is selected as the called party channel time position in AND 86.

While I have described above the principles of my invention in connection with specific apparatus and examples, it is to be clearly understood that this description is made only by way of example and not as a limitation to the scope of my invention as set forth in the objects thereof in the accompanying claims.

I claim:

1. A system for generating output signals to select a designated channel time position present in a plurality of groups of channel time positions comprising:
- a source of a plurality of signals representing said designated channel time position;
- first means coupled to said source responsive to one of said plurality of signals to generate a first signal indicative of a given group of said plurality of groups; and
- second means coupled to said source responsive to others of said plurality of signals to generate a second signal indicative of a channel time position disposed in said given group of said plurality of groups;
- said first and second generated signals enabling the selection of said designated channel time position;

said second means including
- a source of $x$ timing pulses, where $x$ is equal to an integer,
- a source of $y$ timing pulses, where $y$ is equal to an integer, and
- third means coupled to both of said sources of timing pulses to define $x$ times $y$ channel time positions,
- said third means being coupled to said source of signals to generate said second signal in response to said others of said plurality of signals.

2. A system for generating output signals to select a designated channel time position present in a plurality of groups of channel time positions comprising:
- a source of a plurality of signals representing said designated channel time position;
- first means coupled to said source responsive to one of said plurality of signals to generate a first signal indicative of a given group of said plurality of groups; and
- second means coupled to said source responsive to others of said plurality of signals to generate a second signal indicative of a channel time position disposed in said plurality of groups;
- said first and second generated signals enabling the selection of said designated channel time position;
- said first means being responsive to predetermined portions of said one of said plurality of signals; and
- said second means being responsive to predetermined portions of at least one of said others of said plurality of signals;

said second means including
- a source of $x$ timing pulses, where $x$ is equal to an integer,
- a source of $y$ timing pulses, where $y$ is equal to an integer, and
- third means coupled to both of said sources of timing pulses to define $x$ times $y$ channel time positions,
- said third means being coupled to said source of signals to generate said second signal in response to said predetermined portions of at least one of said others of said plurality of signals.

3. A system for generating output signals to select a designated channel time position present in a plurality of groups of channel time positions comprising:
- a source of a plurality of signals representing said designated channel time position;
- first means coupled to said source responsive to one of of said plurality of signals to generate a first signal indicative of a given group of said plurality of groups; and
- second means coupled to said source responsive to others of said plurality of signals to generate a second signal indicative of a channel time position disposed in said given group of said plurality of groups;

said first and second generated signals enabling the selection of said designated channel time position;

said source of signals including a source of three sequential binary numbers each having a plurality of binary digits;

said first means being responsive to given binary digits of the first of said three binary numbers to generate said first generated signal; and said second means being responsive to all the binary digits of the second of said three binary numbers and given binary digits of the third of said three binary numbers to generate said second generated signal.

4. A system for generating output signals to select a designated channel time position present in a plurality of groups of channel time positions comprising:

a source of a plurality of signals representing said designated channel time position;

first means coupled to said source responsive to one of said plurality of signals to generate a first signal indicative of a given group of said plurality of groups; and second means coupled to said source responsive to others of said plurality of signals to generate a second signal indicative of a channel time position disposed in said given group of said plurality of groups;

said first and second generated signals enabling the selection of said designated channel time position;

said source of signals including a source of three sequential binary numbers each having three binary digits of different binary weight;

said first means being responsive to the two most significant weight binary digits of the first of said three binary numbers to generate said first generated signal; and said second means being responsive to the three digits of the second of said three binary numbers and the two most significant weight binary digits of the third of said three binary numbers to generate said second generated signal.

5. A system for generating output signals to select a designated channel time position present in a plurality of groups of channel time positions comprising:

a source of a plurality of signals representing said designated channel time position;

first means coupled to said source responsive to one of said plurality of signals to generate a first signal indicative of a given group of said plurality of groups; and second means coupled to said source responsive to others of said plurality of signals to generate a second signal indicative of a channel time position disposed in said given group of said plurality of groups;

said first and second generated signals enabling the selection of said designated channel time position;

said source of signals including a source of three sequential binary numbers each having three binary digits of different binary weight, a first of three stage register coupled to said source of binary numbers to separately store the binary digits of the first of said three binary numbers, a second three stage register coupled to said source of binary numbers to separately store the binary digits of the second of said three binary numbers, and a third three stage register coupled to said source of binary numbers to separately store the binary digits of the third of said three binary numbers;

said first means being coupled to the stages of said first register storing the two most significant weight binary digits to generate said first generated signal; and said second means being coupled to all the stages of said second register and the stages of said third register storing the two most significant weight digits to generate said second generated signal.

6. A system according to claim 5, wherein said second means includes a source of $x$ timing pulses, where $x$ is equal to an integer, a source of $y$ timing pulses, where $y$ is equal to an integer, $y$ coincident devices coupled to said source of $y$ timing pulses and all said stages of said second register to select in accordance with all the binary digits stored in said second register one group of $x$ adjacent channel time positions from $y$ groups each having different $x$ adjacent channel time positions, $x$ coincident devices coupled to said source of $x$ timing pulses and said two most significant stages of said third register to select in accordance with the two most significant binary digits stored in said third register one group of $y$ spaced channel time positions from $x$ groups each having different $y$ spaced channel time positions, each of said groups of $x$ channel time positions having a channel time position common to the channel time positions included in a given one of said groups of $y$ channel time positions, and a coincident means coupled to said $x$ and $y$ coincident devices responsive to said selected one of said groups of $x$ channel time positions and said selected one of said groups of $y$ channel time positions to generate said second generated signal.

7. A system according to claim 6, wherein said source of $x$ timing pulses and said source of $y$ timing pulses includes a master clock, a binary divider having $y-1$ stages coupled to said clock, and $x+y$ coincident devices coupled to said binary divider to produce $y$ timing pulses and $x$ timing pulses.

8. A system according to claim 5, wherein said second means includes a master clock, a five stage binary divider coupled to said clock, four coincident devices coupled to the first two stages of said divider to provide four timing signals, six coincident devices coupled to the last three stages of said divider to provide six timing signals, six AND circuits each coupled to a different one of said six coincident devices and all said stages of said second register to select in accordance with all the binary digits stored in said second register one group of four adjacent channel time positions from six groups each having different four adjacent channel time positions, four AND circuits each coupled to a different one of said four coincident devices and said two most significant stages of said third register to select in accordance with the two most significant binary digits stored in said third register one group of six spaced channel time positions from four groups each having different six spaced channel time positions;

each of said groups of four channel time positions having a channel time position common to the channel time positions included in a given one of said groups of six channel time positions, and an output AND circuit coupled in common to the output of said six AND circuits and said four AND circuits responsive to said selected one of said groups of six channel time positions and said selected one of said groups of four channel time positions to generate said second generated signal.

9. In a communication system having at least two switching centers interconnected by a first transmission medium, each of said switching centers being coupled to a plurality of additional transmission mediums each conveying intelligence by a plurality of sequentially disposed information channels, a system disposed in each of said switching centers to generate output signals from dialed information indicating the switching center, the particular transmission medium and the information channel present in said particular transmission medium of the called party comprising:

a source of dialed information including three sequential binary numbers each having three binary weighted binary digits;

first means coupled to said source responsive to the least significant weight binary digit of the first of said three binary numbers to generate a first signal indicative of said switch center to which said called party is coupled;

second means coupled to said source responsive to the two most significant weight binary digits of said first of said three binary numbers to generate a second signal indicative of which of said additional transmission mediums said called party is coupled to; and third means coupled to said source responsive to all the digits of the second of said three binary numbers and the two most significant digits of the third of said three binary numbers to generate a third signal indicative of which of said information channels of said indicated additional transmission medium said called party is assigned.

10. A system for generating an output signal to select a designated channel time position present in a plurality of channel time positions comprising:

a first source of at least two sequential binary numbers each having three binary digits;

a second source of $x$ timing pulses, where $x$ is equal to an interger;

a third source of $y$ timing pulses, where $y$ is equal to an interger; and logic circuitry coupled to said first, second and said third sources responsive to all said digits of one of said binary numbers and two predetermined digits of the other of said binary numbers to generate a signal indicative of the channel time position design by said binary number present in $x$ times $y$ channel time positions.

References Cited

UNITED STATES PATENTS 2,867,684 1/1959 Dain.
3,141,067 7/1964 Spandorfer.

RALPH D. BLAKESLEE, Primary Examiner

U.S. Cl. X.R.

179—18.211; 328—103, 152